2,861,940
PRODUCTION OF BLOWN ASPHALTS

Joseph E. Apellaniz, Binghamton, N. Y., assignor to Standard Oil Company, Chicago, Ill., a corporation of Indiana No Drawing. Application July 29, 1955
Serial No. 525,395

5 Claims. (Cl. 208—5)

This invention relates to a method of oxidizing certain high boiling hydrocarbon fractions to produce ductile homogeneous asphalts of high solubility in carbon tetrachloride and low temperature susceptibility. More particularly, the invention relates to an improved catalytic oxidation process, employing a phosphoric acid:boron trifluoride complex as a catalyst for the transformation of high boiling petroleum residuums and the like to asphaltic products.

The production of so-called "blown asphalts" by the air oxidation of various residual oils derived from petroleum is a well-known technique. When blowing such residual oils in the absence of a catalyst to obtain an asphalt of optimum properties, it is practically impossible with most charge stocks to obtain proper penetration and ductility characteristics for a given softening point. If the product is to be used for such purposes as coating irrigation canals, waterproofing conduits, roofing, etc., the combination of properties which are desirable are shown in Table I which is the specification of the U. S. Bureau of Reclamation for "Catalytically Blown Asphalt Cement for Buried Asphalt Canal Lining" (ASTM D–165–42).

TABLE I

| | |
|---|---|
| Softening point, degrees F | 175–200° F. |
| Penetration at 32° F | NLT 30. |
| Penetration at 77° F | 50–60. |
| Penetration at 115° F | NMT 120. |
| Ductility at 77° F | NLT 3.5. |
| Solubility at $CCl_4$ | NLT 97%. |

Many techniques and catalysts have been proposed to modify the air oxidation of the various residual oils to obtain asphalts conforming to the properties shown in Table I. Typical of these processes, and one of the better ones, embodies the use of a phosphorus catalyst such as $P_2O_5$; a process of this type is described in U. S. 2,450,756 to Hoiberg. Using the process taught by Hoiberg, and various other methods of the prior art, it is possible to more closely approach the desired penetration and ductility requirements for a given softening point but only at the expense of lowering carbon tetrachloride solubility and increasing the oxidation time considerably. When certain charge stocks are employed it is practically impossible to meet the carbon tetrachloride solubility specification using the methods taught by the prior art.

It is an object of this invention to provide a method for the production of blown asphalt having a desirable combination of physical properties. It is a further object to provide a method for the production of blown asphalt which requires a relatively short "blowing" time. Another object is to provide an improved method for the catalytic oxidation of asphalts. Still another object is to provide an asphalt having a desirable combination of physical properties which is produced by air blowing a residual oil in the presence of a catalyst.

In accordance with the present invention, a suitable residual oil, of the type hereinafter described in detail, is air blown at an elevated temperature, preferably in the range of about 400° F. to about 550° F., in the presence of a catalyst comprising a complex of phosphoric acid and boron trifluoride. The catalyst may be employed in the range of from about ½ to about 10% and preferably in the range of from about 1 to 2%. The catalyst complex may have a molar ratio of phosphoric acid to boron trifluoride of from about 2:1 to 1:1 and preferably 1:1.

The catalyst useful in the process may be prepared by any conventional method. For instance, it may be prepared by contacting equimolar portions of phosphoric acid and boron trifluoride thus producing a liquid complex having a phosphoric acid to boron trifluoride ratio of 1:1. The complex may be formed at any convenient temperature and generally at ambient room temperature. Although an equimolar complex between the phosphoric acid and boron trifluoride is formed when equimolar portions of reactants are used, the process may be carried out with an excess of phosphoric acid. For instance, an excess of phosphoric acid may be used such that the molar ratio of phosphoric acid to boron trifluoride is about 2:1 or more.

A suitable residual oil employed in the production of blown asphalts for use in the present process is a crude oil residue derived from an asphaltic or semi-asphaltic base stock. Some so-called paraffinic base stocks of the non-asphaltic base class may be blown in air in accordance with the present invention to produce highly useful asphalts, however, it is preferred to employ heavy hydrocarbon fractions derived from such petroleums as those occurring in the U. S. Gulf Coast field, the so-called Mid-Continent crude residual oils and various other asphaltic petroleums. Production of satisfactory blown asphalts has heretofore not been consistently obtainable from residual oils derived from certain sour crudes of the type found in Wyoming. However, such oils have been readily oxidized to useful asphalts in accordance herewith. In addition to those residual oils commercially employed as asphalt base materials, lubricating oil distillates and solvent extracts resulting from the treatment of various petroleum fractions with such selective solvents as phenol, nitrobenzene, B,B'dichloroethylether (Chlorex), $SO_2$, etc., either alone or in combination with other high molecular weight petroleum fractions such as the residual oils or lubricating distillates, may be oxidized in accordance herewith to produce asphaltic products suitable for a wide range of uses. And whereas the present invention is particularly adapted to the production of waterproofing asphalts and the like, it should be apparent that a wide range of stocks may be handled to produce a variety of asphalt products.

The catalyst may be employed in the residual oil in any of the conventional methods; for instance, it may be mixed with an entire batch of residual oil before the air oxidation step or it may be admixed with a portion of the residual oil to form a relatively concentrated mixture which may be in turn mixed with the main body of the residual oil, either before reaching blowing temperature or after blowing temperatures have been attained.

For the purpose of illustrating the oxidation of a typical Wyoming sour crude residual oil to produce an excellent canal lining asphalt, the following example is set forth.

*Example*

1,000 g. of a Wyoming crude residual oil resulting from the atmospheric and vacuum reduction of a sour Wyoming crude mixture was charged to a kettle and heated to about 450° F. 20 g. of an equimolar complex of phosphoric acid and boron trifluoride was added to the residual oil and mixed with a propeller type stirrer having a hollow shaft. The temperature was maintained at 450° F., while stirring, and air was introduced through the hollow stirrer shaft at a rate of 1.25 liters of air per minute per kilogram of residual oil. Blowing at this rate was continued for 311 minutes while maintaining the temperature at 450° F. The blowing was then discontinued and the product cooled.

The results of similar runs at the same temperature with the same feed stock, but with different blowing times and employing phosphorus pentoxide as the catalyst and boron trifluoride as the catalyst are shown in Table II for comparative purposes. Also shown in Table II is a run made at the same temperature, with the same feed stock but in the absence of any catalyst.

TABLE II

| Catalyst | 2% $BF_3:H_3PO_4$ complex | None | 1½% $P_2O_5$ | 1½% $P_2O_5$ | 1% $BF_3$ |
|---|---|---|---|---|---|
| Blowing time (min.) | 311 | 310 | 230 | 600 | 470 |
| Soft. Point, ° F | 182 | 187 | 192 | 190 | 188 |
| Pen. 32° F | 36 | 23 | 34 | 32 | 28 |
| Pen. 77° F | 54 | 33 | 45 | 48 | 41 |
| Pen. 115° F | 93 | 60 | 82 | 87 | 75 |
| Duct. 77° F | 3.2 | 2.5 | 3.0 | 3.3 | 2.9 |
| Sol. $CCl_4$, percent | 97.3 | 99+ | 94.0 | 93.8 | 99.9 |

Comparing the results shown in Table II with the specifications pointed out in Table I, it is obvious that only the blown asphalt made with the phosphoric acid:boron trifluoride catalyst meets the softening point, penetration and carbon tetrachloride specifications. Asphalt prepared in the absence of a catalyst has vastly inferior penetration and ductility characteristics. Very little beneficial effect is to be noted from using only boron trifluoride as a catalyst in spite of the fact that the blowing time is increased from 310 to 470 minutes. The effect of using phosphorus pentoxide is shown in two runs employing blowing times of 230 and 600 minutes. Very little difference is to be noted between the products obtained from these two runs. The penetration characteristics of the product resulting from the 600 minutes blowing time run is very slightly better than that obtained at the lower blowing time; in neither case are they within the specification pointed out in Table I. Carbon tetrachloride solubility is exceedingly poor when phosphorus pentoxide is used. It is well known that increasing the softening point, penetration, and ductility generally decreases the carbon tetrachloride solubility. This is quite apparent in the run in which phosphorus pentoxide was employed, however the deleterious effect on carbon tetrachloride solubility is practically insignificant when employing the phosphoric acid-boron trifluoride complex catalyst. It is readily apparent that only the product resulting from the catalytic oxidation of my invention meets the softening point, penetration and carbon tetrachloride solubility tests set forth by the U. S. Bureau of Reclamation as shown in Table I.

In the normal commercial air oxidation of residual oils, air is introduced rapidly and in large quantities to the charge stock to both oxidize and agitate same. Rates of air introduction of from about 6 to about 70 cubic feet per minute per ton and higher may be employed but it is generally found that an amount of air from about 6 to about 15 cubic feet per minute per ton of charge gives excellent results.

The product may, if desired, be blown with steam toward the end of the blowing cycle to remove any objectionable odors from the oil. Since steaming has a slight adverse effect on the penetration-softening point relationship, it should be started before the product of desired softening point is obtained.

Percentages given herein and in the appended claims are by weight based upon the total hydrocarbon oil charge unless otherwise specified.

In this specification and the appended claims, the term "residual oil" is employed to designate the base stocks which may be oxidized to a blown asphalt in accordance herewith and includes the liquid or semi-solid residues obtained from the distillation of semi-asphaltic and asphaltic petroleums, from the distillation of pressure tar, from the destructive distillation of non-asphaltic petroleum, from the fluxing of harder residual asphalts with heavy distillates, or from mixtures of the foregoing.

Having thus described my invention, what I claim as novel and desire to protect by Letters Patent is as follows:

1. A process for producing blown asphalts which comprises air blowing a residual oil at an elevated temperature in the presence of a catalyst comprising a complex of phosphoric acid and boron trifluoride.

2. The process of claim 1 wherein the temperature is maintained within the range of from about 400° F. to about 550° F.

3. The process of claim 1 wherein the catalyst is employed in the range of from about 0.5% to about 10%.

4. The process of claim 1 wherein the catalyst complex has a molar ratio of phosphoric acid-boron trifluoride of from about 2:1 to about 1:1.

5. A process for producing blown asphalts which comprises air blowing a residual oil at a temperature of from about 400° F. to about 550° F. in the presence of from about 0.5% to about 10% of a phosphoric acid-boron trifluoride containing catalyst prepared by saturating phosphoric acid with boron trifluoride.

References Cited in the file of this patent

UNITED STATES PATENTS

| 2,179,208 | Burk et al. | Nov. 7, 1939 |
| 2,272,866 | Burk et al. | Feb. 10, 1942 |
| 2,640,803 | Illman et al. | June 2, 1953 |
| 2,676,910 | Edson | Apr. 27, 1954 |
| 2,762,755 | Kinnaird | Sept. 11, 1956 |